US012565414B2

(12) United States Patent
Hartnett et al.

(10) Patent No.: US 12,565,414 B2
(45) Date of Patent: Mar. 3, 2026

(54) BEVERAGE DISPENSER

(71) Applicant: Flo-Smart Beverage Solutions IP Pty Ltd, Braeside (AU)

(72) Inventors: Conal Hartnett, Braeside (AU); Matthew James Dale, Braeside (AU)

(73) Assignee: Flo-Smart Beverage Solutions IP Pty Ltd, Braeside (AU)

( * ) Notice: Subject to any disclaimer, the term of this patent is extended or adjusted under 35 U.S.C. 154(b) by 0 days.

(21) Appl. No.: 17/795,321

(22) PCT Filed: Jan. 29, 2021

(86) PCT No.: PCT/AU2021/050060

§ 371 (c)(1),
(2) Date: Jul. 26, 2022

(87) PCT Pub. No.: WO2021/151157

PCT Pub. Date: Aug. 5, 2021

(65) Prior Publication Data

US 2023/0053940 A1 Feb. 23, 2023

(30) Foreign Application Priority Data

Jan. 31, 2020 (AU) ................................ 2020900268

(51) Int. Cl.
*B67D 1/12* (2006.01)
*B67D 1/08* (2006.01)

(52) U.S. Cl.
CPC ......... *B67D 1/1236* (2013.01); *B67D 1/0857* (2013.01); *B67D 1/0888* (2013.01); *B67D 1/0894* (2013.01)

(58) Field of Classification Search
CPC ...... B67D 1/00; B67D 1/1236; B67D 1/0857; B67D 1/0888; B67D 1/0894
See application file for complete search history.

(56) References Cited

U.S. PATENT DOCUMENTS

| | | | | |
|---|---|---|---|---|
| 4,437,499 A | | 3/1984 | Devale | |
| 4,462,220 A | * | 7/1984 | Iannelli .................... | B67D 1/06 62/201 |

(Continued)

FOREIGN PATENT DOCUMENTS

| | | | |
|---|---|---|---|
| GB | 2205638 | A | 12/1988 |
| WO | 2013/003900 | A1 | 1/2013 |

OTHER PUBLICATIONS

PCT International Search Report for PCT Application No. PCT/AU2021/050060 mailed Apr. 19, 2021 (7 pages).

(Continued)

*Primary Examiner* — Timothy L Maust
(74) *Attorney, Agent, or Firm* — Merchant & Gould P.C.

(57) ABSTRACT

A beverage dispenser for dispensing a beverage into a vessel, the beverage dispenser including a vessel-receiving region in which the vessel is locatable for receiving beverage; and a sensor arrangement for providing signals based on which a distance between one or more wall portions of the vessel, when located in the vessel-receiving region, and the sensor arrangement can be determined, wherein a volume of beverage to be dispensed into the vessel can be determined based on the determined distance between one or more wall portions of the vessel and the sensor arrangement.

20 Claims, 2 Drawing Sheets

(56) References Cited

U.S. PATENT DOCUMENTS

| | | | | |
|---|---|---|---|---|
| 4,658,872 | A | 4/1987 | Ellis | |
| 4,676,400 | A * | 6/1987 | Lamont | B67D 1/0867 222/146.6 |
| 5,335,705 | A * | 8/1994 | Morishita | B67D 1/04 222/61 |
| 5,372,014 | A * | 12/1994 | Adams | B67D 1/0867 62/119 |
| 8,109,301 | B1 * | 2/2012 | Denise | F25D 23/126 222/113 |
| 9,352,952 | B2 * | 5/2016 | Nicholls | B67D 1/06 |
| 9,796,575 | B2 * | 10/2017 | Deng | A47J 31/4482 |
| 10,017,371 | B2 * | 7/2018 | Vulpitta | B67D 1/108 |
| 10,526,185 | B2 * | 1/2020 | Jagannathan | B67D 1/0037 |
| 11,339,047 | B2 * | 5/2022 | Chernov | G01F 22/00 |
| 2008/0216504 | A1 | 9/2008 | Kim et al. | |
| 2008/0264092 | A1 | 10/2008 | Chase et al. | |
| 2015/0305548 | A1 * | 10/2015 | Girault | G06K 7/1421 99/283 |
| 2017/0283236 | A1 | 10/2017 | Jagannathan et al. | |
| 2018/0127255 | A1 * | 5/2018 | Baysal | F25D 23/126 |
| 2018/0201492 | A1 | 7/2018 | Jung et al. | |

OTHER PUBLICATIONS

PCT Written Opinion for PCT Application No. PCT/AU2021/050060 mailed Apr. 19, 2021 (7 pages).

Extended European Search Report dated Sep. 25, 2023 for the corresponding European patent application No. 21747524.3 (9 pages).

* cited by examiner

BEVERAGE DISPENSER

CROSS-REFERENCE TO RELATED APPLICATIONS

This application is a National Stage Application of PCT/AU2021/050060, filed 29 Jan. 2021, which claims benefit of Serial No. 2020900268, filed 31 Jan. 2020 in Australia, and which applications are incorporated herein by reference. To the extent appropriate, a claim of priority is made to each of the above disclosed applications.

FIELD OF THE INVENTION

The invention relates to a beverage dispenser.

SUMMARY OF THE INVENTION

An aspect of the present invention provides a beverage dispenser for dispensing a beverage into a vessel, the beverage dispenser including: a vessel-receiving region in which the vessel is locatable for receiving beverage; and a sensor arrangement for providing signals based on which a distance between one or more wall portions of the vessel, when located in the vessel-receiving region, and the sensor arrangement can be determined, wherein a volume of beverage to be dispensed into the vessel can be determined based on the determined distance between one or more wall portions of the vessel and the sensor arrangement.

The beverage dispenser preferably further includes a body having a first portion and a second portion spaced apart from the first portion, a wall of the vessel, when located in the vessel-receiving region, being abuttable against the first and second portions, the sensor arrangement is configured to provide said signals when the vessel abuts the first and second portions. The first and second portions are preferably longitudinally spaced apart from each other along a horizontal axis.

The sensor arrangement may include a sensor locatable between the first and second portions. The sensor may be located inside the body. Preferably, the body includes the sensor arrangement. In other embodiments, the sensor is located on a surface of the body.

The body preferably has an elongate channel having an open end for receiving the vessel. The channel preferably has a substantially U-shaped cross-section with two elongate edges, one elongate edge corresponding to the first portion and the other elongate edge corresponding to the second portion. For example, the channel may have semicircular profile or partially circular profile. In other embodiments, the channel may have a square profile, a trapezoidal profile, a partially elliptical profile, a V-shape profile, or a profile of any other geometrical-shape.

The body may have a forward-facing surface on which the first and second portions are located, the forward-facing surface facing the vessel when vessel abuts the first and second portions. A distance between the first and second portions is preferably substantially constant along a width (or height) of the forward-facing surface. In other embodiments, the distance of the first and second portions may vary along a width (or height) of the forward facing surface. For example, a distance between the first and second portion at one of the uppermost portion or the lowermost portion of the forward-facing surface may be greater than a distance between the first and second portion at the other of the uppermost portion or the lowermost portion of the forward facing surface.

The sensor arrangement preferably includes a sensor for measuring distance. For example, the sensor may be an inductive sensor or an ultrasonic sensor.

The beverage dispenser preferably further includes a controller, wherein upon detecting that the vessel is in the vessel-receiving region, the controller is configured to operate the dispenser to dispense beverage into the vessel. The controller may be further configured to operate the dispenser to dispense a volume beverage into the vessel based on the determined distance between the sensor and the wall portion of the vessel.

The beverage dispenser preferably further includes two or more nozzles including a first nozzle for dispensing a first beverage and a second nozzle for dispensing a second beverage, and two or more beverage-conveying tubes portions including a first tube portion for conveying the first beverage from a first beverage container to the first nozzle and a second tube portion for conveying the second beverage from a second beverage container to the second nozzle, the first tube portion being different from the second tube portion.

According to an aspect of the present invention, there is provided a beverage dispenser for dispensing different beverages, the beverage dispenser including: two or more nozzles including a first nozzle for dispensing a first beverage and a second nozzle for dispensing a second beverage, and two or more beverage-conveying tubes portions including a first tube portion for conveying the first beverage from a first beverage container to the first nozzle and a second tube portion for conveying the second beverage from a second beverage container to the second nozzle, the first tube portion being different from the second tube portion.

The container in which the beverage is stored is preferably a refillable container.

The beverage dispenser may further include a first vessel-receiving region in which a vessel is locatable for receiving the first beverage from the first nozzle and for receiving the second beverage from the second nozzle.

The two or more nozzles may include a third nozzle for dispensing beverage. The third nozzle may be for dispensing one of the first beverage from the first beverage container or the second beverage from the second beverage container. Preferably, the third nozzle is for dispensing a third beverage. The beverage-conveying tubes may include a third tube portion for conveying the third beverage from a third beverage container, the third tube portion being different from the first and second tube portions.

The two or more nozzles include may a fourth nozzle for dispensing beverage. The fourth nozzle may be for dispensing the other of the first beverage from the first beverage container or the second beverage from the second beverage from the second beverage container. Preferably, the fourth nozzle is for dispensing a fourth beverage. The beverage-conveying tubes may include a fourth tube portion for conveying the fourth beverage from a fourth beverage container, the fourth tube portions being different from the first, second, and third tube portions.

The beverage dispenser preferably includes a second vessel-receiving region in which a vessel is locatable for receiving the beverage from the third nozzle and the beverage from the fourth nozzle. In other embodiments the beverage dispenser includes more than two vessel-receiving region, each region for receiving beverage from at least one of the two or more nozzles.

The beverage dispenser preferably includes a pump arrangement operable to simultaneously dispense beverages from the two or more nozzles. The pump arrangement may be configured to dispense beverages in the first vessel-receiving region and in the second vessel-receiving region simultaneously.

The beverage dispenser preferably includes a sensor arrangement for detecting if a vessel is in proximity to at least one of the two or more nozzles. In response to the sensor detecting the vessel in proximity to the at least one of the two or more nozzles, the at least one of the two or more nozzles is preferably operable to dispense beverage into the vessel.

Preferably, each container in which the respective one of the beverages is stored has a capacity of more than 10 litres. Preferably, the capacity of the container is about 15 to 25 litres. Further preferably, the capacity of the container is about 18 litres.

The beverage dispenser may further include at least one of the cooling system described below and the control system described below.

According to another aspect of the present invention, there is provided a cooling system for a beverage dispenser, the beverage dispenser for dispensing beverage from a beverage container via a nozzle, the beverage dispenser including a beverage-conveying tube for conveying the beverage from the beverage container to the nozzle, the cooling system including: a cooling tube arrangement for cooling, or maintaining a temperature of, the beverage flowing through the beverage-conveying tube, the cooling tube arrangement including one or more cooling tube portions through which a cooling fluid is passable, the one or more cooling tube portions being locatable adjacent the beverage conveying tube or being adapted to receive the beverage conveying tube.

The cooling system preferably further includes a reservoir for storing the cooling fluid, the one or more cooling tube portions being in fluid communication with the reservoir such that the cooling fluid from the reservoir is passable through the one or more cooling tube portions.

The cooling system may further include a pump that is operated to circulate the cooling fluid from the reservoir, through the one or more cooling tube portions to cool the at least a portion of the beverage tube, and back to the reservoir.

The reservoir preferably includes a refrigerated coil or a heat exchanger for cooling the cooling fluid.

According to a further aspect of the present invention, there is provided a beverage dispenser including: a nozzle for dispensing beverage from a beverage container; a beverage-conveying tube for conveying the beverage from the beverage container to the nozzle; and the cooling system described above.

Yet a further aspect of the present invention provides a control system for a beverage dispenser, the control system being configured to: receive an input, from a user, representing a number of portions of beverage desired by the user; determine a volume of beverage required to be dispensed based on the received input; and operate a pump of a beverage dispenser to dispense the volume of beverage via the nozzle of the dispenser.

According to another aspect of the present invention provides a beverage dispenser including: a nozzle for dispensing beverage from a beverage container; a pump operable to dispense beverage from the nozzle; and the control system described above.

BRIEF DESCRIPTION OF THE DRAWINGS

Preferred embodiments of the invention will now be described, by way of non-limiting example, with reference to the accompanying drawings in which.

DETAILED DESCRIPTION

Figure 1A:
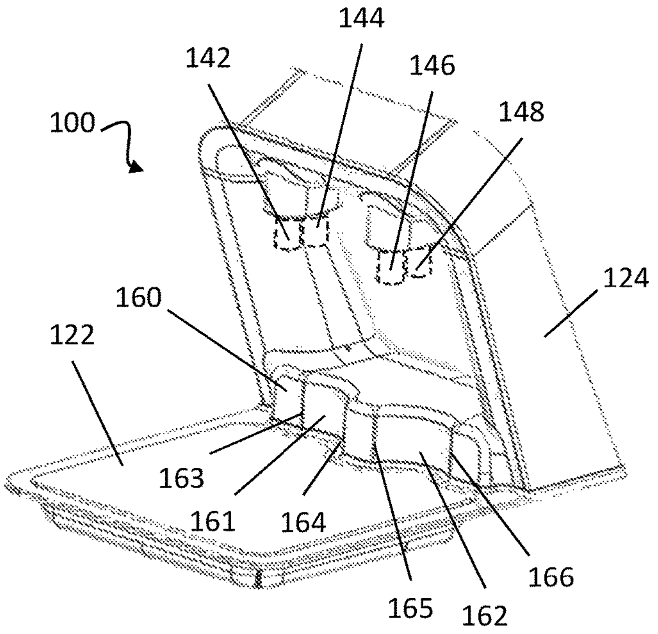
FIGS. 1A and 1B show perspective and side views of a dispenser according to an embodiment of the present invention.
Figure 1B:
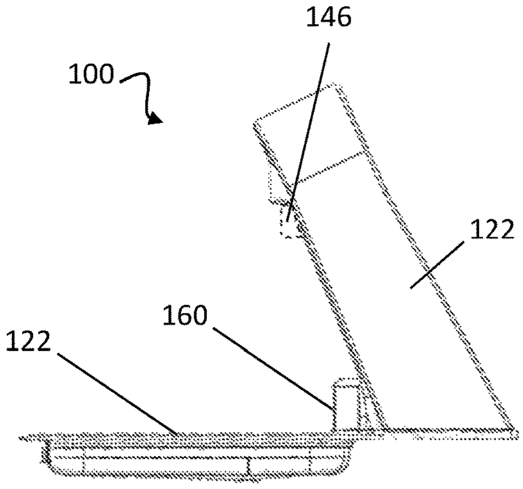
Figure 1C:
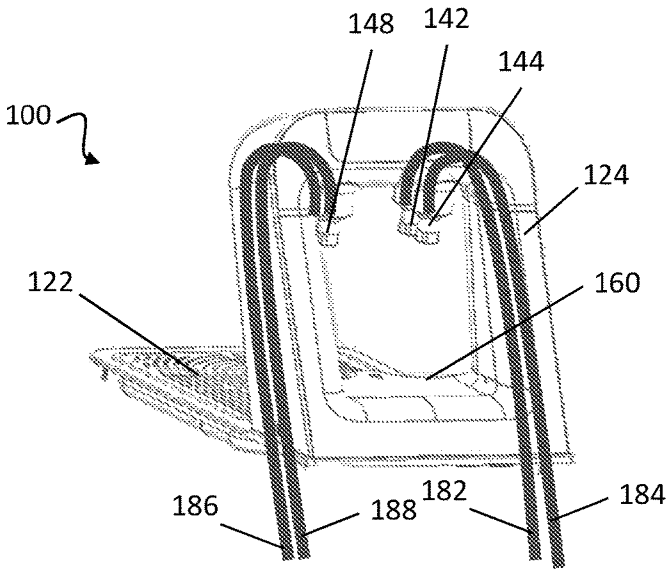
FIG. 1C shows a perspective view of the dispenser of FIGS. 1A and 1B from the rear showing beverage dispensing lines that are internally housed within the dispenser.

A beverage dispenser 100 according to an embodiment of the present invention is shown in FIGS. 1A to 1C. The beverage dispensing different beverages that are each stored in a refillable container. The beverage may be normal milk, skim milk, almond milk, soymilk, normal water, sparkling water, fruit juice, vegetable juice, or any other ready-to-drink beverage.

Figure 3:
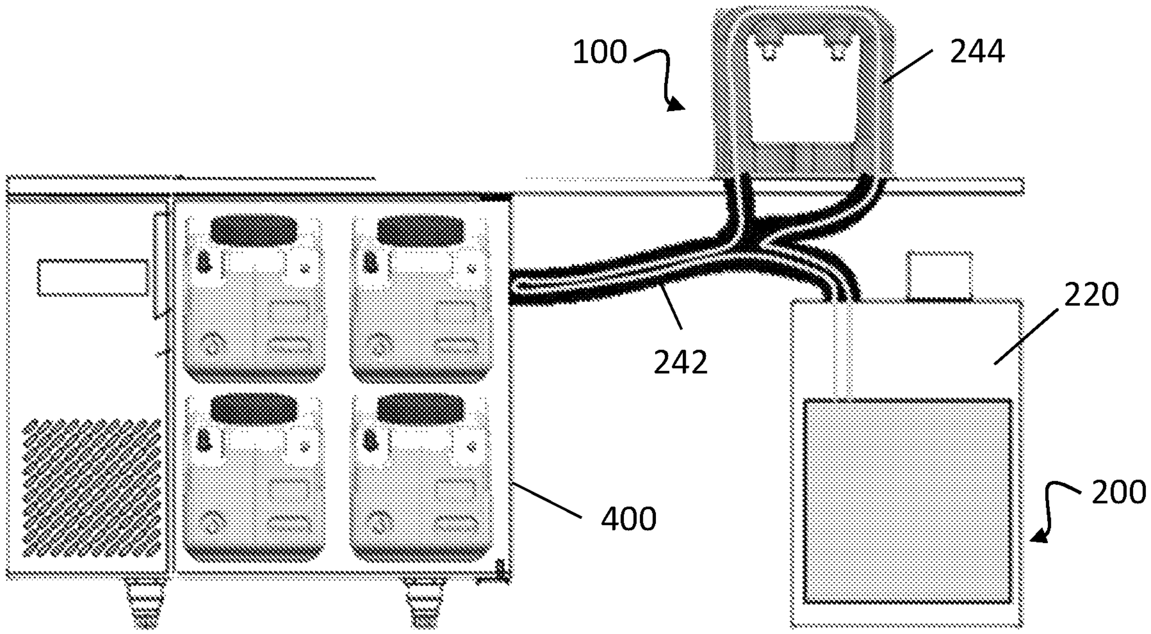
FIG. 3 shows a schematic view of the system with the dispenser of FIGS. 1A and 1B.

The refillable containers (which are shown in FIG. 3) for storing the beverages are plastic or other hard-walled containers. Each container in which the respective one of the beverages is stored has a capacity of about 18 litres. In other examples, each container may have a capacity of more than 10 litres, preferably between about 15 to 25 litres inclusive. These containers are located in a refrigerator, for example, for keeping the beverage stored therein chilled.

The beverage dispenser 100 has a base tray 122 on which a vessel for receiving the beverage(s) is located. The tray 122 has a grill structure for drainage. Any spilt beverage would fall onto, and be collected by, the tray 122. In addition, when the vessel is removed from the beverage dispenser, any accumulated beverage in the nozzle that drips out of therefrom would also be captured by the tray. The tray has a substantially rectangular profile. In other examples, the tray may have a circular profile. The beverage dispenser 100 is mounted to a benchtop (e.g. a kitchen benchtop or a café benchtop) by securing the tray 122 in a recess of rebate in the benchtop such that a top surface of the tray is substantially flush with a top surface of the rest of the benchtop.

The beverage dispenser 100 has a frame 124 that is angled relative to the tray (as best seen in the side view shown in FIG. 1B). The frame 124 has two arm portions that extend upwardly away from the tray and a top portion that connects the uppermost portions of the two arm portions. There is an opening defined between the arm portions and the top portion of the frame 124 such that the vessel when located on the tray is visible from the other side of the beverage dispenser, through the opening. The frame is a housing for housing the beverage-conveying tubes and the cooling tubes as will be described in further detail below.

The beverage dispenser 100 has four nozzles 142, 144, 146, 148 that protrude downwardly from the top portion of the frame 124. Each nozzle is for dispensing a different beverage. The beverage dispenser 100 has two vessel-receiving regions. A vessel locatable in a first one of the vessel-receiving regions can receive beverage from a first nozzle 142 and a second nozzle 144. A vessel locatable in a second one of the vessel-receiving regions can receive beverage from a third nozzle 146 and a fourth nozzle 148. The first and second nozzles 142, 144 are spaced apart from the third and fourth nozzles 146, 148 such that the beverage dispenser can receive, and dispense beverage into, two vessels simultaneously; one vessel in the first vessel-receiving region and another vessel in the second vessel-receiving region. In addition, when a vessel is located in one of the vessel receiving regions, the beverage dispenser can dispense beverage out of the nozzles for that region simultaneously or one-at-a-time.

In other embodiments of the present invention, the beverage dispenser may have only one vessel-receiving region with at least two nozzles for that region, or more than two vessel-receiving regions with at least one nozzle in each region.

The beverage that is dispensed from a nozzle 142/4 in the first region is different from the beverage that is dispensed from either nozzle 146, 148 in the second region. Alternatively, beverage that is dispensed from the nozzles from the nozzle in the first region may the same as a beverage that is dispensed from one of the nozzles in the second region.

Referring to FIG. 1C, the beverage dispenser 100 includes four beverage-conveying tubes portions 182, 184, 186, 188. A first tube portion 182 is for conveying a first beverage from a first beverage container to the first nozzle 142. A second tube portion 184 is for conveying a second beverage from a second beverage container to the second nozzle 144. A third tube portion 186 is for conveying a third beverage from a third beverage container to the third nozzle 146. A fourth tube portion 188 is for conveying a fourth beverage from a fourth beverage container to the fourth nozzle 148. Each of the tube portions are different and distinct from each other. In particular, beverage from each container goes directly to the allocated nozzle and does not mix with the beverage stored in the other container. Thereby, there is no cross-contamination of beverages either between the containers and the nozzle or at the nozzles.

The first and second tube portions 182, 184 are contained within the first arm of the frame 124 and run along the first arm to the upper portion of the frame from which the first and second nozzles are downwardly disposed. The third and fourth tube portions 186, 188 are contained within the second arm of the frame 124 and run along the second arm to the upper portion of the frame from which the third and fourth nozzles are downwardly disposed.

The beverage dispenser has a pump arrangement for conveying beverage from the containers to the nozzle. The pump arrangement has four pumps operable to convey beverage from the container to the allocated nozzle. The pump arrangement can be operable to simultaneously dispense beverages from two or more nozzles, either in the same region or in different regions.

Referring to FIG. 1A, the beverage dispenser 100 has a body 160 on the tray 122 from where the first and second arms of the frame 124 extend.

The beverage dispenser 100 includes a sensor arrangement for providing signals based on which a distance between one or more wall portions of the vessel and the sensor arrangement can be determined. Based on these signals, a volume of beverage to be dispensed into the vessel can subsequently also be determined. The sensor arrangement preferably includes one or more sensors located inside the body 160. In other examples, the sensor arrangement may be located on an outer surface of the body 160.

The body 160 has two spaced apart elongate channels 161, 162, each for receiving a vessel. A first one of the channels 161 is located in the first vessel-receiving region for receiving beverage from the first and second nozzles 142, 144 and a second one of the channels 162 is located in the second vessel-receiving region for receiving beverage from the third and fourth nozzles 146, 148. Each channel 161, 162 has an open end for receiving a vessel. The channel has a vertical orientation, such that a length of the elongate channel extends along a vertical axis from a bottom surface of the tray 122 to a top portion of the frame 124.

Each channel 161, 162 has a substantially U-shaped cross-section. For example, the channel may have semicircular profile or partially circular profile. In other embodiments, the channel may have a square profile, a trapezoidal profile, a partially elliptical profile, a V-shape profile, or a profile of any other geometrical-shape. The size of a first one of the two channels may be smaller than a size of the second one of the channels, such that the first channel is for receiving smaller-sized vessels while the second channel is for receiving larger-sized vessels.

Each elongate channel 161; 162 has a first elongate edge 163; 165 and a second elongate edge 164; 166. The first and second elongate edges, in particular, extend along a vertical axis, along a length of the channel 161, 162. A distance between the first and second elongate edges corresponds to a width of the channel. When a vessel is received by the channel 161; 162, a wall of the vessel would abut against the first and second elongate edges 163, 164; 165, 166.

Figure 2:
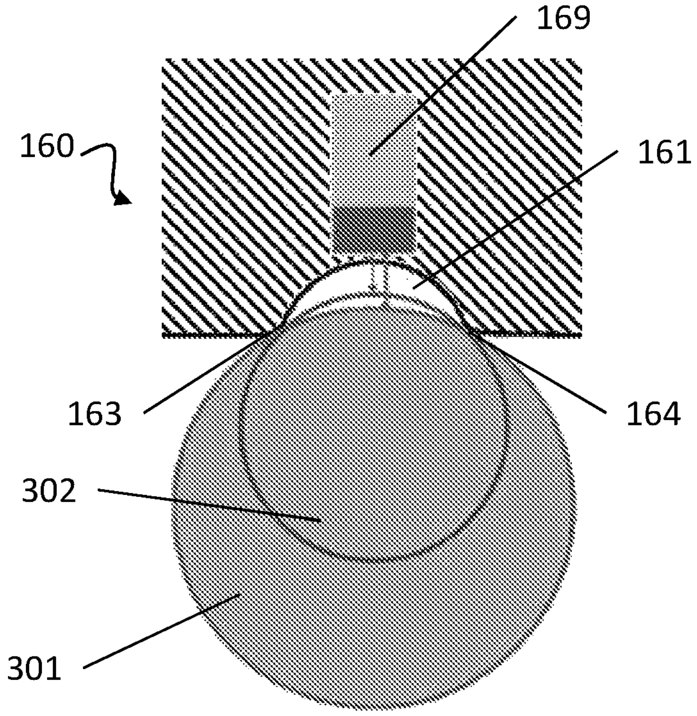
FIG. 2 shows a sectional view of a sensor block of the dispenser of FIGS. 1A and 1B with different sized vessels.

Referring to FIG. 2, which shows a close-up cross sectional view of the first channel 161 of the body 160, the sensor arrangement has a sensor that is longitudinally located between the first elongate edge 163 and the second elongate edge 164. The sensor is, for example, an inductive sensor or an ultrasonic sensor. Two vessels of different sizes are shown to be received by the channel 161. A first vessel 301 is larger in diameter compared to the second vessel 302. Depending on the size of the vessel, when the vessel contacts the first and second elongate edges 163, 164, a distance of a wall portion of the vessel to the sensor would vary. A distance between the wall portion and the sensor would be larger when a large vessel 301 is located in a channel compared to when a small vessel 302 is located in the channel. Based on the distance between the wall portion and the sensor, a controller system is able to determine the size of the vessel and the volume of beverage for dispensing into the vessel without causing the vessel to overflow.

The volume of beverage to be dispensed into a beverage can be set by the user. For example, the user can place a new vessel (e.g. a jug) in the channel such that the elongate edges of the channel abut the vessel. The beverage dispenser controller determines that the vessel is a new vessel based on a newly determined distance between the sensor and wall portion of the new vessel. Once located, the user can specify the volume of beverage to be dispensed into the vessel or hit a start-stop button on the dispenser to control the volume of beverage dispensed into the dispenser. The controller allows the user to save the setting, in a computer-readable memory in communication with the controller, in relation to the new vessel such that when the user places the same vessel (or vessel of a similar size) in the channel, the system automatically dispenses the same volume of beverage into the vessel once the vessel abuts the elongate edges of the channel.

Alternatively, the user can provide an input to the controller representing a number of portions of beverage desired by the user. Based on the input from the user, the controller determines a volume of beverage required to be dispensed based on the received input; and operate a pump of a beverage dispenser to dispense the volume of beverage when a vessel is located to abut edges of the channel. The controller then allows the user to save the number of beverage portions (or a total beverage volume) dispensed in relation to the vessel that was used to collect the beverage such that when the same vessel (or vessel of a similar size) is later located to abut edges of the channel, the controller is configured to dispense the saved number of beverage portions (or the total beverage volume) into the vessel.

The beverage dispenser includes another sensor arrangement for detecting if a vessel is in proximity to at least one of the two or more nozzles. In particular, the sensor arrangement may include one or more pressure sensors for measuring when a vessel abuts the elongate edges of a channel. In addition, the sensor arrangement may include a pressure sensors for detecting when a vessel is resting on the tray.

Referring to FIG. 3, a cooling system 200 for a beverage dispenser has a reservoir 220 for storing a cooling fluid and a cooling tube arrangement 242, 244 through which the cooling fluid from the reservoir is passable for cooling, or maintaining a temperature of, the beverage flowing through the beverage-conveying tube. The reservoir has a refrigerated coil or a heat exchanger for cooling the cooling fluid. The cooling tube arrangement one or more cooling tube portions being in fluid communication with the reservoir.

The cooling tube arrangement has one or more cooling tube portions through which a cooling fluid is passable, the one or more cooling tube portions being locatable adjacent the beverage conveying tube. In particular, the cooling tube arrangement has a first cooling tube portion 242 from the reservoir to the cooling chamber in which the containers storing the beverage are stored and a second cooling tube portion 244 from the cooling chamber back to the reservoir, through the nozzles. In other embodiments, the cooling tube portions are adapted to receive the beverage conveying tube. For example, the beverage conveying tube is locatable inside the cooling tube portions.

The cooling system may further include a pump that is operated to circulate the cooling fluid from the reservoir, through the one or more cooling tube portions to cool the at least a portion of the beverage tube, and back to the reservoir.

While various embodiments of the present invention have been described above, it should be understood that they have been presented by way of example only, and not by way of limitation. It will be apparent to a person skilled in the relevant art that various changes in form and detail can be made therein without departing from the spirit and scope of the invention. Thus, the present invention should not be limited by any of the above described exemplary embodiments.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavor to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The claims defining the invention are as follows:

1. A beverage dispenser for dispensing a beverage into a vessel, the beverage dispenser including:

a housing having a vessel-receiving region that is configured to locate a first vessel in position to receive beverage from a first nozzle;

a beverage conveying tube within the housing for conveying beverage from a beverage container to the first nozzle;

a sensor arrangement proximate the vessel-receiving region for detecting a presence of a first vessel within the vessel-receiving region, including a sensor inside the housing that is configured to measure a distance between the first vessel and the sensor arrangement through an outer surface of the housing; and a controller that is configured to identify the first vessel as a known size of vessel based on the distance measured by the sensor arrangement;

wherein a volume of beverage to be dispensed into the first vessel is determined by the controller based on a pre-set volume associated with the known size of vessel.

2. The beverage dispenser of claim 1, wherein the housing includes a first portion and a second portion spaced apart from the first portion, the first and second portions being adapted to guide and locate the vessel into the vessel-receiving region, with the vessel, when located in the vessel-receiving region, being simultaneously abuttable against each of the first and second portions.

3. The beverage dispenser of claim 1, wherein the sensor arrangement includes an inductive sensor for measuring the distance between one or more wall portions of the first vessel and the sensor arrangement.

4. The beverage dispenser of claim 1, wherein the vessel-receiving region is an open-ended elongate channel having a substantially U-shaped cross-section.

5. The beverage dispenser of claim 1, wherein the sensor arrangement includes an ultrasonic sensor for measuring the distance between one or more wall portions of the first vessel and the sensor arrangement.

6. The beverage dispenser of claim 1, wherein the controller compares the distance measured by the sensor arrangement to saved distances stored within a memory of the controller, with each saved distance representing a different known size of vessel, with the controller being configured to operate the dispenser to dispense the pre-set volume of beverage that is associated with the identified vessel.

7. The beverage dispenser of claim 1, further including:

two or more nozzles including the first nozzle for dispensing a first beverage and a second nozzle for dispensing a second beverage; and two or more beverage-conveying tube portions including a first tube portion for conveying the first beverage from a first beverage container through the housing to the first nozzle and a second tube portion for conveying the second beverage from a second beverage container through the housing to the second nozzle, the first tube portion being different from the second tube portion.

8. The beverage dispenser of claim 7, wherein the two or more nozzles include a third nozzle for dispensing beverage.

9. The beverage dispenser of claim 8, wherein the third nozzle is for dispensing one of the first beverage from the first beverage container or the second beverage from the second beverage container; or dispensing a third beverage, with the beverage-conveying tubes including a third tube portion for conveying the third beverage from a third beverage container, the third tube portion being different from the first and second tube portions.

10. The beverage dispenser of claim 9, wherein the two or more nozzles include a fourth nozzle for dispensing beverage, wherein the fourth nozzle is for dispensing one of the first beverage from the first beverage container or the second beverage from the second beverage container; or dispensing a fourth beverage, with the beverage-conveying tubes including a fourth tube portion for conveying the fourth beverage from a fourth beverage container, the fourth tube portion being different from the first, second and third tube portions.

11. The beverage dispenser of claim 7, wherein the vessel-receiving region is a first vessel-receiving region, with the housing further including a second vessel-receiving region in which a vessel is locatable.

12. The beverage dispenser of claim 11, wherein the beverage(s) is/are simultaneously dispensable into vessels located within the first vessel-receiving region and in the second vessel-receiving region.

13. The beverage dispenser of claim 7, further comprising a cooling tube arrangement for cooling, or maintaining a temperature of, the beverage flowing through at least one of the beverage-conveying tubes, the cooling tube arrangement including one or more cooling tube portions through which a cooling fluid is passable, the one or more cooling tube portions being locatable adjacent the respective beverage conveying tubes or being adapted to respectively receive the beverage conveying tubes.

14. The beverage dispenser of claim 13, further including a reservoir for storing the cooling fluid, the one or more cooling tube portions being in fluid communication with the reservoir such that the cooling fluid from the reservoir is passable through the one or more cooling tube portions.

15. The beverage dispenser of claim 14, further including a pump for circulating the cooling fluid from the reservoir, through the one or more cooling tube portions to cool the beverage tubes, and back to the reservoir.

16. The beverage dispenser of claim 15, wherein the reservoir contains a heat exchanger for cooling the cooling fluid.

17. A beverage dispenser for dispensing a beverage into a vessel, the beverage dispenser including:

a housing having first and second spaced apart portions for locating a vessel within a vessel-receiving region of the housing;

a sensor arrangement proximate the vessel-receiving region which includes a sensor inside the housing configured to measure a distance between the first vessel and the sensor arrangement through an outer surface of the housing; and a controller that is configured to identify the first vessel as a known size of vessel based on the distance measured by the sensor arrangement;

wherein a volume of beverage to be dispensed into the first vessel is determined by the controller based on a pre-set volume associated with the known size of vessel.

18. A method of automatically dispensing beverage into a vessel with a beverage dispenser, comprising the steps of:

detecting a presence of a vessel within a receiving region of a housing of the beverage dispenser with a sensor arrangement provided inside the housing;

measuring a distance between the vessel and the sensor arrangement through an outer surface of the housing with a sensor of the sensor arrangement;

identifying the vessel as known size of vessel saved within a memory of a controller of the dispenser based on the measured distance;

conveying a volume of beverage from a beverage container to a nozzle via a beverage conveying tube within the housing, wherein the volume is a pre-set volume determined by the controller that is associated with the known vessel; and dispensing the volume of beverage into the vessel via the nozzle.

19. The method of claim 18, wherein the step of identifying the vessel comprises the controller comparing the distance measured by the sensor arrangement to saved distances stored within a memory thereof, with each saved distance representing a different known size of vessel and having a pre-set volume associated therewith.

20. The method of claim 18, further comprising the additional step of:

locating the vessel within the receiving region by having the vessel abut against two spaced-apart edges of the housing that bound a channel within the housing that provides the receiving region.

* * * * *